United States Patent
Plätzer

(10) Patent No.: US 7,175,711 B2
(45) Date of Patent: Feb. 13, 2007

(54) COATING DEVICE

(75) Inventor: Wilfried Plätzer, Krefeld (DE)

(73) Assignee: Band-Zink GmbH, Langenfeld (DE)

( * ) Notice: Subject to any disclaimer, the term of this patent is extended or adjusted under 35 U.S.C. 154(b) by 230 days.

(21) Appl. No.: 10/518,741

(22) PCT Filed: Jun. 14, 2003

(86) PCT No.: PCT/EP03/06302

§ 371 (c)(1),
(2), (4) Date: Dec. 17, 2004

(87) PCT Pub. No.: WO04/001088

PCT Pub. Date: Dec. 31, 2003

(65) Prior Publication Data
US 2005/0223976 A1    Oct. 13, 2005

(30) Foreign Application Priority Data
Jun. 21, 2002    (DE)    ................................ 102 27 778

(51) Int. Cl.
B05C 19/02    (2006.01)
(52) U.S. Cl. ........................................ 118/423; 118/419
(58) Field of Classification Search ................ 384/906; 118/419, 423, 405
See application file for complete search history.

(56) References Cited

U.S. PATENT DOCUMENTS 4,881,829 A    11/1989    Koelsch ........................ 384/448

2003/0075105 A1    4/2003    Plaetzer ...................... 118/423

FOREIGN PATENT DOCUMENTS

| DE | 39 40 890      | 6/1991  |
| DE | 195 11 943 A1  | 10/1996 |
| DE | 199 21 191 A1  | 9/2000  |
| DE | 101 04 032 A1  | 8/2001  |
| DE | 200 06 302 U   | 10/2001 |
| EP | 0 794 339 A1   | 9/1997  |
| EP | 1 096 034 A2   | 5/2001  |
| EP | 1 197 572 A1   | 4/2002  |
| WO | WO 91/03581    | 3/1991  |
| WO | WO 92/11398    | 7/1992  |
| WO | WO 01/77401 A1 | 10/2001 |

Primary Examiner—Brenda A. Lamb
(74) Attorney, Agent, or Firm—Fay, Sharpe, Fagan, Minnich & McKee, LLP

(57) ABSTRACT

A coating device (10) for coating a metal strip (12) in a metal melt (14) includes a shaft (16,18) that is rotatable in the metal melt (14) for guiding the metal strip (12), and a slide bearing (26₁, 26₂) for supporting the shaft (16,18). The slide bearing (26₁, 26₂) is formed by a bearing housing (32) and a bearing bushing (34) that has several pairs (36₁–36₄) of bearing surfaces and is configured so as to be circumferentially closed. The bearing bushing (34) is adapted to be set in selected rotational positions in circumferential direction in the bearing housing (32). A releasable bearing bushing fixing element (40) locks the bushing in each of the selected rotational positions with respect to the bearing housing (32). Thereby, a worn pair (36₁–36₄) of bearing surfaces can be simply replaced by a non-worn pair (36₁–36₄) of bearing surfaces by a rotation of the bearing bushing.

10 Claims, 3 Drawing Sheets

COATING DEVICE

BACKGROUND OF THE INVENTION

The invention relates to a coating device for coating a metal strip in a melt of a metal.

Coating devices are used for coating metal strips and sheet metals with zinc, aluminum, tin, lead, galvalum or galfan. In doing so, the metal strip or sheet metal is drawn through a metal melt of the coating metal which is several hundred degrees hot: the metal strip is continuously immersed downward into the metal melt, is deviated upward by a rotating deviating shaft in the metal melt, is steadied by a stabilizing shaft and runs upwards out of the metal melt again. The support of the deviating shaft and/or the stabilizing shaft in the melt is effected in open slide bearings which are configured as wearing bearings. Because of the occurring great radial forces, the high melt temperature and the possibly high chemical aggressiveness of the metal melt, the slide bearings are subject to heavy wear. In a continuously operating coating installation, the slide bearings are worn so heavily even after a few days that they have to be replaced. Each of the slide bearings is formed by a bearing housing and a non-closed bearing bush which is held therein and includes a pair of bearing surfaces. If the pair of bearing surfaces is worn, i.e., if the respective shaft journal has pitted deeply into the two bearing surfaces, the complete bearing bush must be replaced by a new bearing bush. To this end, the shaft journals have to be withdrawn from the bearing housing while the shaft is lifted out of the metal melt. Only then, the worn bearing bushings can be replaced by new bearing bushings. Thus, several hours are required to exchange the two bearings, which is a great cost factor.

It is an object of the invention to extend the service life of a bearing bush.

SUMMARY OF THE INVENTION

In the coating device according to the invention, the bearing bush is configured so as to be closed in circumferential direction and comprises at least three bearing surfaces forming several pairs of bearing surfaces. In circumferential direction, the bearing bush in the bearing housing is adapted to be rotated and set in several rotational positions. For locking the bearing bush in the set rotational position, a releasable bearing bush fixing element is provided. Now, each slide bearing comprises at least three bearing surfaces forming at least two different pairs of bearing surfaces with each other. The bearing bush is arranged so as to be rotated and fixed in the bearing housing so that, after one pair of bearing surfaces is worn, the bearing bush can be twisted so far that another partially or completely non-worn pair of bearing surfaces can be used. After one pair of bearing surfaces is worn, an exchange of the entire bearing bush is thus avoided once or several times. Thereby, the service life of a bearing bush, i.e., the time interval between a complete exchange and the next complete exchange of the bearing bush is considerably extended. It only takes a short time to replace a worn pair of bearing surfaces by a non-worn pair of bearing surfaces of the same bearing bush. This reduces the maintenance costs and extends the operation times of the coating installation.

The configuration of the bearing bush, which is completely closed circumferentially, further largely avoids the expansion of the two bearing surface which is unavoidable in non-closed bearing bushs at high radial loads. This, in turn, reduces the risk of fracture in the zone between the two bearing surfaces to a minimum. This means that by the closed configuration, the bearing bush is stabilized against the expansion forces caused by the shafts at high radial loads and a fracture is avoided.

According to a preferred embodiment, the bearing bush comprises several separate pairs of bearing surfaces, i.e., several pairs of bearing surfaces which do not overlap. Particularly, the bearing bush comprises four pairs of bearing surfaces so that it has eight bearing surfaces altogether. Preferably, the bearing surfaces are equally distributed over the entire circumference in the form of an equilateral polygon. With four pairs of bearing surfaces, this consequentially results in that the angle included between two neighboring bearing surfaces respectively amounts to 135°.

According to a preferred embodiment, the bearing bush's outside comprises at least two fixing grooves into which the fixing element is insertable to lock the bearing bush. The fixing element can be configured in the form of a feather key and establishes the positive connection between the bearing housing and the bearing bush in circumferential direction. For setting a new non-worn pair of bearing surfaces, the fixing element is withdrawn from the first fixing groove, the bearing bush is twisted such that a non-worn pair of bearing surfaces is in its working position, and the fixing element is now inserted into the second fixing groove arranged correspondingly to fix the bearing bush in this rotational position. Thus, an ability of the bearing bush of being rotated and reliably fixed is realized with simple means.

According to a preferred embodiment, each pair of bearing surfaces has a fixing groove associated thereto.

Preferably, the bearing bush consists of ceramics, e.g., of zircon oxide.

According to a preferred embodiment, the shaft is a stabilizing shaft in the metal melt, but may also form the deviating shaft.

Still further advantages of the present invention will be appreciated to those of ordinary skill in the art upon reading and understand the following detailed description.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

DETAILED DESCRIPTION OF THE PREFERRED EMBODIMENTS

Figure 1:
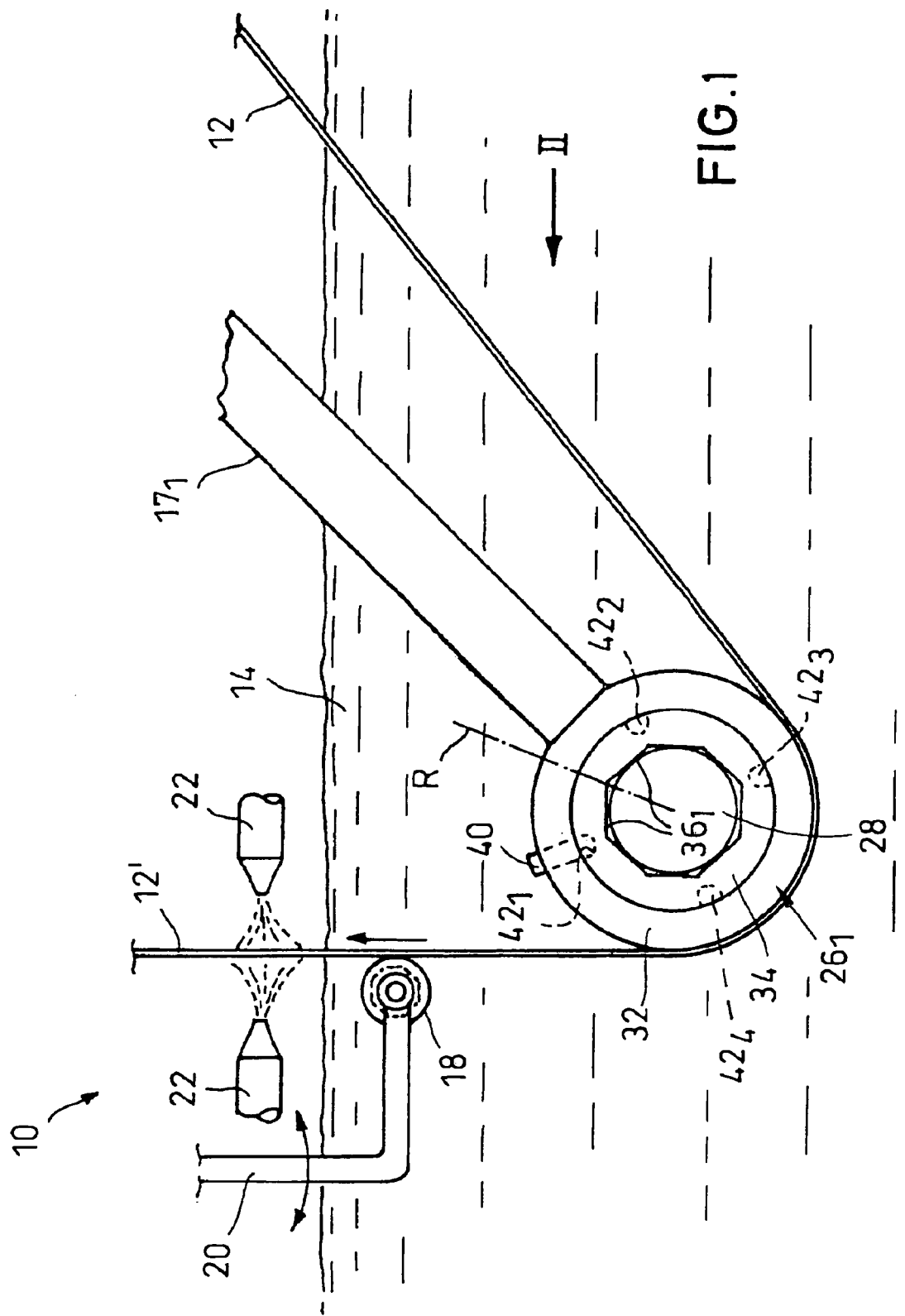
FIG. 1 shows a coating device according to the invention, comprising a deviating shaft and a stabilizing shaft in a metal melt in side view.
Figure 2:
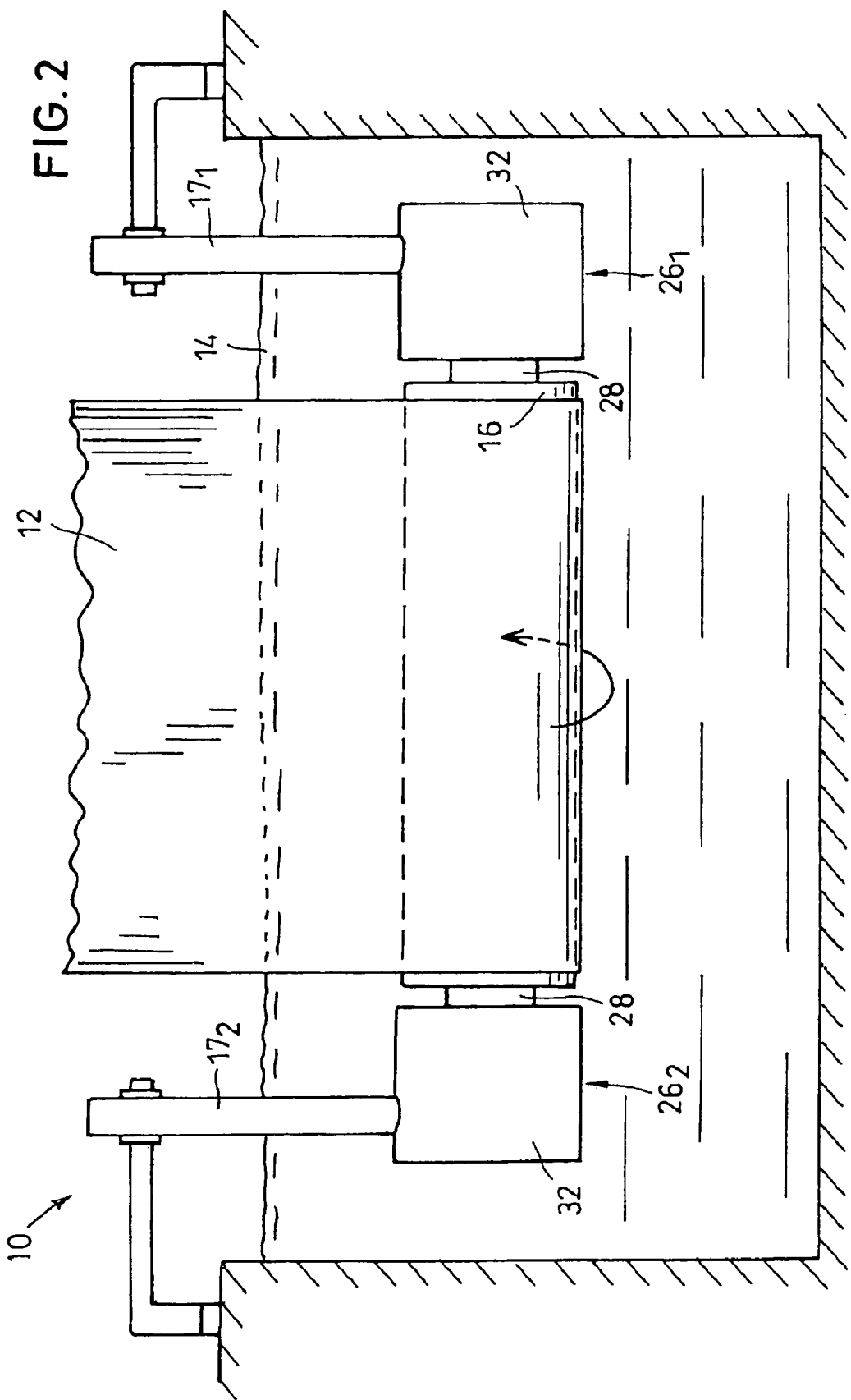
FIG. 2 shows the coating device of FIG. 1 in front view.
Figure 3:
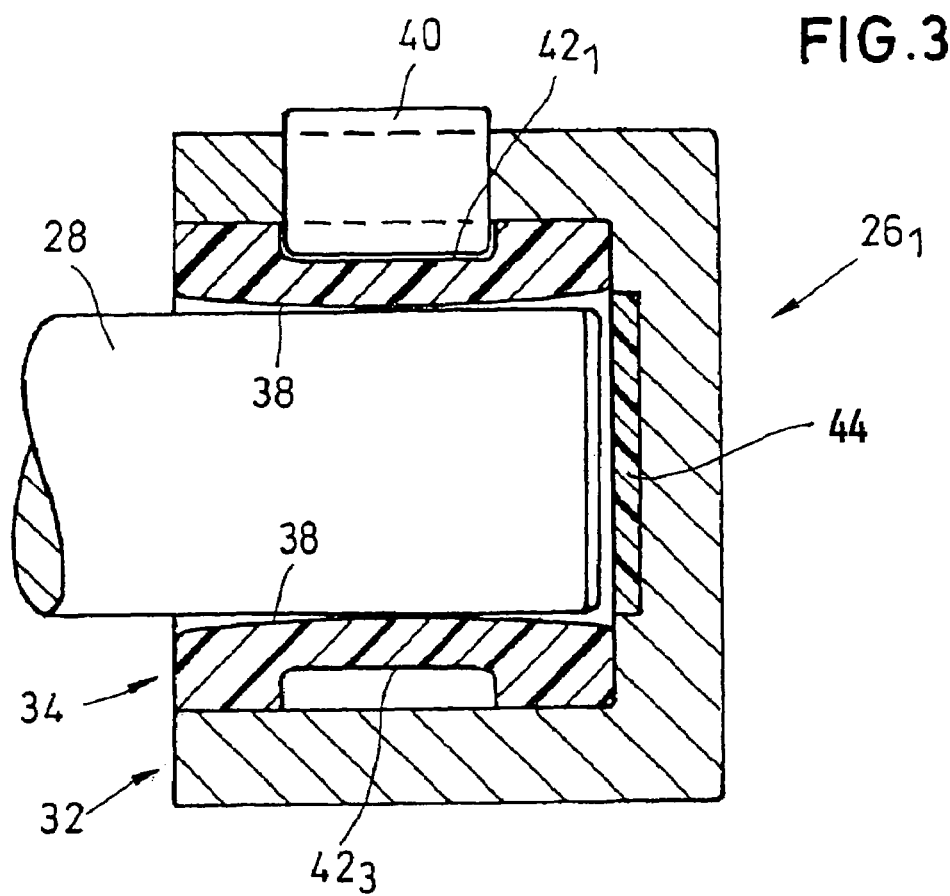
FIG. 3 shows a longitudinally sectioned view of a slide bearing of the coating device of FIG. 1.
Figure 4:
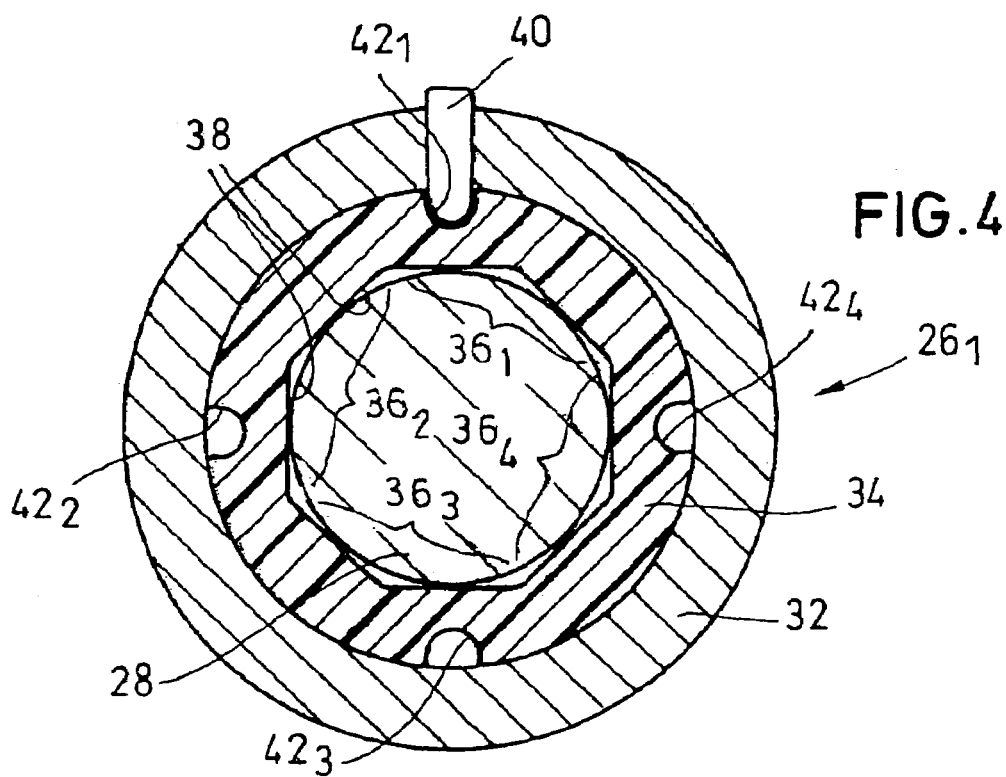
FIG. 4 shows a cross section of a slide bearing of the coating device of FIG. 1.

In FIG. 1, a side view of a coating device 10 is illustrated in a simplified manner. A metal strip 12 is led through a metal melt 14 to provide the surface of the metal strip 12 with a thin metal coating. The metal melt may consist of liquid zinc, lead, tin, aluminum, galvalum, galfan or other metals suitable for coating metal. Depending on the type of the molten metal, the metal melt 14 has a temperature of 400–1000° C.

The metal strip 12 is introduced into the molten metal 14 at an angle of 30–45° to the horizontal line and deviated upwards in the melt 14 by a rotatable deviating shaft 16 so that the metal strip 12' is led vertically upwards out of the metal melt 14 again. The angle of wrap of the metal strip 12,12' around the deviating shaft 16 amounts to approximately 130°. The tensile force of the metal strip 12 amounts to between 1.0–5.0 tons.

For stabilizing the metal strip 12,12', a stabilizing shaft 18 abuts on the metal strip 12' moving vertically out of the metal melt 14 to dampen and to reduce the horizontal fluttering of the metal strip 12'. The stabilizing shaft 18 is suspended at a movable guide arm 20 that is pivotably supported and biased in horizontal direction towards the metal strip 12'. Further, the stabilizing shaft guide arm 20 is dampened in its horizontal movement by a corresponding dampening element. In operation, both the deviating shaft 16 and the stabilizing shaft 18 are continuously immersed into the metal melt 14.

At both sides of the vertically extending metal strip 12' leaving the metal melt 14, gas nozzles 22,24 are arranged through which a gas flow is applied onto both sides of the metal strip 12'. By the gas flow, the liquid metal layer on the metal strip 12' is reduced to a specified uniform layer thickness.

The deviating shaft 16 is held in the metal melt 14 by two pivot arms $17_1, 17_2$. For maintenance and repair purposes, the deviating shaft 16 is adapted to be lifted out of the metal melt 14. For this purpose, the pivot arm 20 with the stabilizing shaft 18 is adapted to be lifted out of the metal melt 14 as well. The arms $17_1, 17_2, 20$ are lifted out of the metal melt 14 by means of a non-illustrated changer-cross-head to which they are mounted. In FIG. 1, the deviating shaft 16 and the metal strip 12,12' are illustrated in cross section.

As can be seen in FIG. 1–4, the two immersed ends of the pivot arms $17_1, 17_2$ are provided with slide bearings $26_1, 26_2$ each in which the deviating shaft 16 is rotatably supported. The two slide bearings $26_1, 26_2$ are wearing bearings which are substantially formed by a bearing housing 32 and a bearing bush or bushing 34 inserted therein. The two shaft journals 28 of the deviating shaft 16 are inserted and supported in the bearing bushing 34. The bearing bushing is a sleeve which is completely closed circumferentially in the way of a cylinder and which comprises four pairs $36_1$–$36_4$ of bearing surfaces altogether. Each pair $36_1$–$36_4$ of bearing surfaces is formed by two neighboring bearing surfaces 38. All bearing surfaces 38 are equally distributed over the circumference so that they form together an equilateral octagon with an angle of 135° between two neighboring bearing surfaces 38. Each bearing bushing is integrally formed and consists of zircon oxide but may also consist of another ceramic material.

The outer circumference of the bearing bushings 34 and the inner circumference of the bearing housing 32 consisting of metal have the form of an annular ring or sleeve each, a gap of about 0.5 mm remaining between the bearing bushing outside and the bearing bushing inside. Thus, it is ensured that the bearing bushing 34 can be virtually turned in the bearing housing 32 without any resistance Each bearing surface 38 has a straight configuration in cross section and a slightly convex configuration in longitudinal section; as a consequence, there is virtually only a punctual contact surface with the shaft journal 28.

In the region of the closed bottom of the bearing housing 32, an axial stop plate 44 of ceramics is mounted.

As is particularly apparent from FIG. 1, the resultant force R of the radial forces acting on the two slide bearings $26_1$, $26_2$, which has been occasioned by the two tensioned metal strip legs, acts approximately in the direction of the median line of the angle of the two legs of the metal strip 12, 12'. The two bearing surfaces 38 of a pair of bearing surfaces in its position of use are arranged approximately at both sides of the radial force resultant R, i.e., the radial force resultant R lies about in the middle between the two bearing surfaces 38 of the respective pair $36_1$ of bearing surfaces. As soon as the two bearing surfaces 38 of a pair $36_1$ of bearing surfaces are worn, the respective pivot arms $17_1, 17_2, 20$ are pivoted out of the metal melt 14. In the state of being pivoted out, the fixing element 40 is withdrawn from the fixing element opening of the bearing housing 32 and the first fixing groove $42_1$ of the bearing bush 34 and turned by 90°. Thereby, the worn pair $36_1$ of bearing surfaces is turned out of its position of use and an unworn pair $36_2$ of bearing surfaces is turned into the position of use. In this new rotational position of the bearing bush 34, the fixing element 40 is inserted into the associated fixing groove $42_2$ and thus, the bearing bush 34 is secured against twisting in circumferential direction. Subsequently, the corresponding pivot arms $17_1, 17_2, 20$ are lowered into the metal melt 14 into their working positions again.

With its shaft journals, the stabilizing shaft 18 is also borne in circumferentially closed bearing bushings with four pairs of bearing surfaces. Here, a worn pair of bearing surfaces is also replaceable by a non-worn pair of bearing surfaces by twisting the bearing bushing.

By providing several pairs of bearing surfaces in the bearing bushing and by the bearing bushing's ability of rotating and being fixed in the bearing housing, a worn pair of bearing surfaces can simply be replaced by twisting. The bearing bushing must be exchanged only when all pairs of bearing surfaces are worn.

The invention has been described with reference to the preferred embodiments. Modifications and alterations may occur to others upon reading and understanding the preceding detailed description. It is intended that the invention be constructed as including all such modifications and, alterations insofar as they come within the scope of the appended claims or the equivalents thereof.

The invention claimed is:

1. A coating device for coating a metal strip in a metal melt, comprising:
    a shaft rotatably supported in the metal melt by means of a slide bearing, for guiding the metal strip, the slide bearing being formed by:
        a bearing housing,
        a bearing bushing with a pair of bearing surfaces defined therein, the bearing bushing being circumferentially closed and including at least three bearing surfaces such that the bearing bushing is adapted to be set in several rotational positions in circumferential direction in the bearing housing, and
        a releasable bearing bushing fixing element for locking the bearing bushing in each of the set of rotational positions with respect to the bearing housing.

2. The coating device according to claim 1, wherein the bearing bushing comprises several pairs of bearing surfaces.

3. The coating device according to claim 2, wherein the bearing bushing comprises four pairs of bearing surfaces.

4. The coating device according to claim 1, wherein the bearing surfaces are equally distributed over the circumference of the bearing bushing and form an equilateral polygon.

5. The coating device according to claim 1, wherein the bearing bushing comprises at least two fixing grooves at its outside into which the fixing element is insertable for locking the bearing bushing.

6. The coating device according to claim 2, wherein each pair of bearing surfaces has a fixing groove associated thereto.

7. The coating device according to claim 1, wherein the bearing bushing is constructed of ceramics.

8. The coating device according to claim 1, wherein the shaft is a stabilizing shaft.

9. A coating device for coating a metal strip in a melt, the device comprising:

a shaft for guiding the metal strip;

a bearing in which the shaft is rotatably received the bearing including:
a bearing housing,
a sleeve bushing rotatably received in the bushing housing, the sleeve bushing defining an interior bore with a plurality of bearing surfaces, selected pairs of the bearing surfaces being rotatable to orientations to engage the shaft in a direction of radial force, and
a mechanism for fixing the sleeve bushing to select the pair of bearing surfaces that engage the shaft.

10. The coating device according to claim 9, wherein the sleeve bushing has a cylindrical outer surface and the inner bore has a polygonal cross-section.

* * * * *